US006097820A

United States Patent [19]
Turner

[11] Patent Number: 6,097,820
[45] Date of Patent: Aug. 1, 2000

[54] SYSTEM AND METHOD FOR SUPPRESSING NOISE IN DIGITALLY REPRESENTED VOICE SIGNALS

[75] Inventor: Michael D. Turner, Madison, N.J.

[73] Assignee: Lucent Technologies Inc., Murray Hill, N.J.

[21] Appl. No.: 08/772,396

[22] Filed: Dec. 23, 1996

[51] Int. Cl.[7] .................................................... H04B 15/00
[52] U.S. Cl. .......................................... 381/94.3; 381/94.2
[58] Field of Search ..................... 381/71, 94, FOR 123, 381/FOR 124

[56] References Cited

U.S. PATENT DOCUMENTS

| | | | |
|---|---|---|---|
| 4,491,701 | 1/1985 | Duttweiler et al. | 381/101 |
| 4,628,529 | 12/1986 | Borth et al. | 381/94 |
| 4,630,304 | 12/1986 | Borth | 381/71 |
| 4,669,122 | 5/1987 | Swinbanks | 381/71.12 |
| 4,811,404 | 3/1989 | Vilmur et al. | 381/94 |
| 5,251,263 | 10/1993 | Andrea | 381/94 |
| 5,377,277 | 12/1994 | Bisping | 381/94 |
| 5,400,409 | 3/1995 | Linhard | 381/94 |
| 5,550,924 | 8/1996 | Helf et al. | 381/94.3 |
| 5,563,953 | 10/1996 | Kwon | 381/94.3 |
| 5,586,190 | 12/1996 | Trantow et al. | 381/71.12 |

OTHER PUBLICATIONS

Article entitled "Enhancement and Bandwidth Compression of Noisy Speech" by Jae S. Lim and Alan V. Oppenheim From the Proceedings of the IEEE, vol. 67, No. 12, Dec. 1979; pp. 1586–1604.

Article entitled "Suppression of Acoustic Noise in Speech Using Spectral Subtraction" by Steven F. Boll From the IEEE Transactions on Acoustics, Speech and Signal Processing, vol. ASSP-27, No. 2, Apr. 1979; pp. 61–68.

*Primary Examiner*—Curtis Kuntz
*Assistant Examiner*—Xu Mei

[57] ABSTRACT

A noise suppressor that increases a signal to noise ratio of time domain audio data and a method of increasing such signal to noise ratio. The noise suppressor includes: (1) frequency domain transformation circuitry that transforms a frame of the time domain audio data into a frequency domain, (2) noise background modeling circuitry, coupled to the domain transformation circuitry, that spectrally analyzes the frame to model an estimated noise background spectrum thereof, (3) a frequency domain suppression filter, coupled to the noise background modeling circuitry, that filters at least some of the noise background spectrum from the frame and (4) time domain transformation circuitry, coupled to the frequency domain suppression filter, that transforms the frame back into a time domain, the transformed frame having an increased signal to noise ratio.

17 Claims, 3 Drawing Sheets

SYSTEM AND METHOD FOR SUPPRESSING NOISE IN DIGITALLY REPRESENTED VOICE SIGNALS

TECHNICAL FIELD OF THE INVENTION

The present invention is directed, in general, to noise suppression systems and, more specifically, to an improved system and method of noise suppression using frequency domain techniques.

BACKGROUND OF THE INVENTION

A wide variety of acoustic noise suppression systems are available for improving the quality of a desired signal by separating it from the background noise. In voice communication systems in particular, it is highly desirable to eliminate, or at least minimize, the background noise so as to maximize the signal-to-noise ratio (SNR) of the voice signal.

Noise suppression techniques typically involve having a front end voice activity detector (VAD) to separate the speech-only and noise-only portions of the incoming audio data. During the noise-only portions, characteristics of the noise signal are collected, such as level, spectral shape, duration, etc. This information is used to model the noise background and to construct an inverse filter which is applied to both noise-only and speech-only regions to suppress the contribution of the noise.

Noise suppression systems based on the above described techniques are described in detail in "Enhancement and Bandwidth Compression of Noisy Speech," J. S. Lim, A. V. Oppenheim, Proceedings of the IEEE, Vol. 67, No. 12, pp. 1568–1604, December 1979 (hereafter, the "Lim reference") , and in "Suppression of Acoustic Noise in Speech Using Spectral Subtraction," S. F. Boll, IEEE Transactions on Acoustics, Speech, and Signal Processing, Vol. ASSP-27, No. 2, pp. 113–120, April 1979 (hereafter, the "Boll reference"). Each of the Lim reference and the Boll reference is hereby incorporated by reference for all purposes. Other noise suppression systems are disclosed in U.S. Pat. No. 4,811,404 to Vilmur et al. (hereafter, the "Vilmur '401 reference") and U.S. Pat. No. 4,628,529 to Borth et al. (hereafter, the "Borth '529 reference"). Each of the Vilmur '401 reference and the Borth '529 reference is hereby incorporated by reference for all purposes.

The addition of a noise suppressor is particularly important in a telephone device, such as a cellular telephone or a conventional "wired" telephone, that uses a voice coder or speech coder to compress the bandwidth of a speech signal prior to transmission of the signal. Speech coders use a model based on the characteristics of speech signals that degrades in performance as the level of background noise increases. Addition of noise suppression on the front end of a variable-rate speech coder improves the overall performance of the speech coder in at least two ways. The reduction of the background noise assists the rate selection algorithm of the speech coder in distinguishing the speech portions of the signal from the noise portions of the signal. Additionally, it compensates for the lack of robustness in low-rate speech coders to produce a higher quality output even under noisy conditions.

There is therefore a need in the art for improved systems and methods for suppressing noise in an audio signal. In particular there is a need for adaptive noise suppression systems and methods that rapidly adjust to changing levels in an incoming signal comprising both speech and background noise.

SUMMARY OF THE INVENTION

To address the above-discussed deficiencies of the prior art, the present invention provides a noise suppressor that increases a signal to noise ratio of time domain audio data and a method of increasing such signal to noise ratio. The noise suppressor includes: (1) frequency domain transformation circuitry that transforms a frame of the time domain audio data into a frequency domain, (2) noise background modeling circuitry, coupled to the domain transformation circuitry, that spectrally analyzes the frame to model an estimated noise background spectrum thereof, (3) a frequency domain suppression filter, coupled to the noise background modeling circuitry, that filters at least some of the noise background spectrum from the frame and (4) time domain transformation circuitry, coupled to the frequency domain suppression filter, that transforms the frame back into a time domain, the transformed frame having an increased signal to noise ratio.

The present invention introduces the broad concept of dynamically modeling the noise background spectrum of frequency-transformed audio data to enable a frequency domain suppression filter to reduce the noise background in the frequency domain. By reducing the noise background, a subsequent processor (such as a vocoder, particularly one capable of encoding at variable rates) can operate on the transformed audio data more effectively.

In one embodiment of the present invention, the noise suppressor further comprises a time domain suppression filter, coupled to the time domain transformation circuitry, that high-pass filters the transformed frame to increase the signal to noise ratio further. The high-pass filtering can mask certain undesirable artifacts in the audio data that remain after the frequency domain noise-filtering.

In one embodiment of the present invention, the noise background modeling circuitry is coupled to a voice activity detector ("VAD"), the noise background modeling circuitry modeling the estimated noise background spectrum as a function of a speech/no speech signal received from the VAD. The noise background modeling circuitry may model differently depending upon the state of the speech/no-speech signal or may choose whether or not to model at all depending upon the state. Of course, the accuracy of the VAD determines the accuracy of the speech/no speech signal and therefore how the noise background is modeled.

In one embodiment of the present invention, the noise background modeling circuitry models the estimated noise background spectrum only when the frame contains substantially no signal. By modeling (or updating the modeling of) the estimated noise background spectrum only when noise is present, a more stable model is likely to be obtained. Usually, the indication of whether or not the frame contains a substantial signal is obtained from a VAD. However, the indication may be contained explicitly in the data itself.

In one embodiment of the present invention, the noise background modeling circuitry exponentially smooths the frame with past frames of the time domain audio data to model the estimated noise background spectrum. Exponential smoothing stabilizes the model of the noise background spectrum. Those skilled in the art will recognize, however, that some applications may not require a stable model, or may benefit from a model that is stabilized by other than exponential smoothing.

In one embodiment of the present invention, the frequency domain transformation circuitry and the time domain transformation circuitry each comprise fast Fourier transform ("FFT") circuitry. Those skilled in the art are familiar with FFT circuitry (and, in particular, digital FFT circuitry containing buffers).

In one embodiment of the present invention, the frame is less than 1 second long. In a more specific embodiment, the frame is 10 milliseconds (msec.) long. If the audio data are digital and the sample rate is 8 KHz, 80 data points are contained in a 10 msec. frame. The 10 msec. frame can be loaded into a 128 data point FFT buffer for transformation, noise modeling and filtering.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
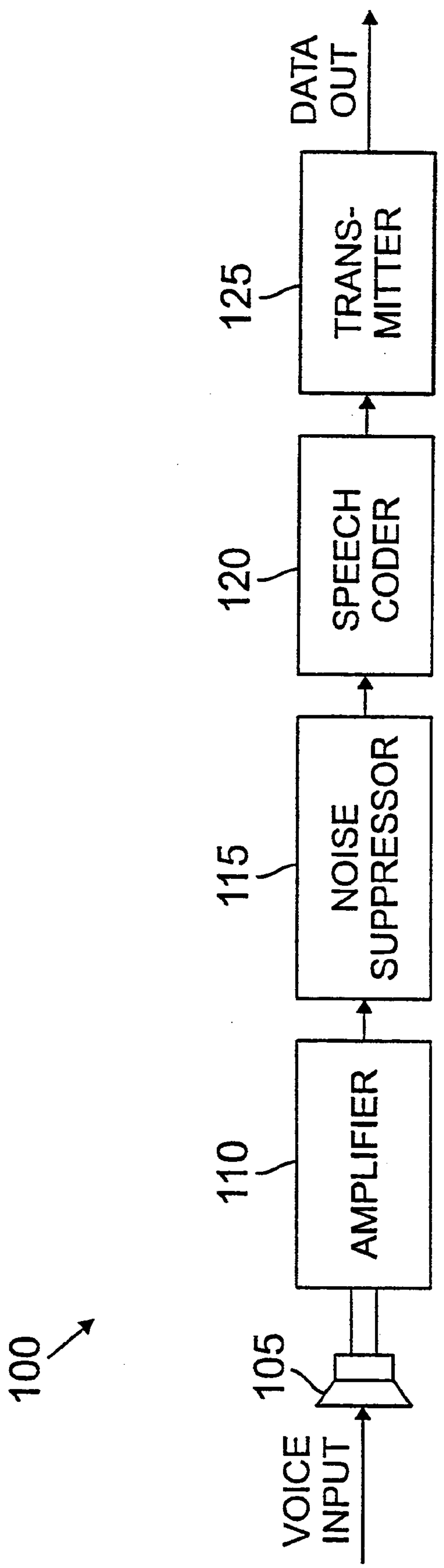
FIG. 1 illustrates a high level block diagram of telephone device including a noise suppressor in accordance with one embodiment of the present invention.

FIG. 1 illustrates a high level block diagram of telephone device 100, including noise suppressor 115 in accordance with one embodiment of the present invention. Telephone device may be any common telephone device, such as a cellular telephone or a conventional "wired" telephone. Microphone 105 picks up the sound of a user's voice, as well as background noise. The background noise exists during speech periods and during non-speech periods (silence). The output of microphone 105 is amplified to an appropriate level by amplifier 110. In a preferred embodiment, amplifier 110 includes automatic gain control circuitry for automatically adjusting the amplifier output to account for changes in the strength of the input signal. Amplifier 110 also contains an analog-to-digital converter (ADC) that converts the analog voice signal received from microphone 105 to a digital signal. The digitally represented voice signal is output by amplifier 110 and then filtered by noise suppressor 115, which will be described in greater detail below.

Noise suppressor 115 removes at least part, and preferably most, of the noise picked up by microphone 105, and outputs a reduced noise signal to speech coder 120. Speech coder 120 may be any one of a number of speech coder devices, including a variable rate voice coder (vocoder), a waveform codec, or the like. Speech coder 120 may provide time compression of input speech, bandwidth reduction, or both, depending on the application. By reducing the level of background noise in the voice signal, particularly very low frequencies, noise suppressor 115 enhances the performance of downstream processing devices, such as speech coder 120, which frequently are designed to operate on relatively noiseless signals. The output of speech coder 120 is sent to transmitter 125, which transmits the compressed signal to a receiving telephone device, either through land lines or through RF transmission (cellular).

Figure 2:
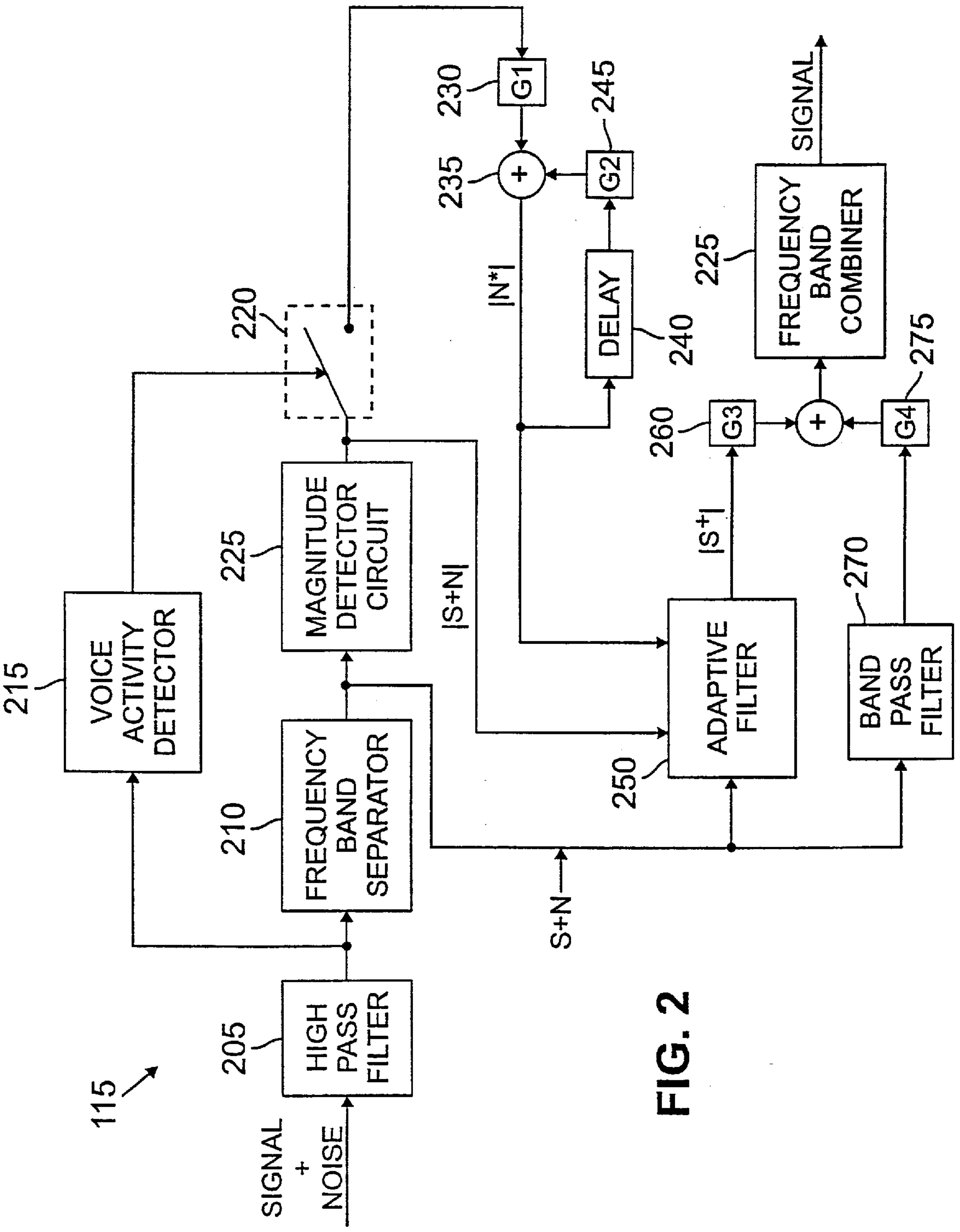
FIG. 2 illustrates a block diagram of a noise suppressor in accordance with one embodiment of the present invention.

FIG. 2 illustrates a block diagram of noise suppressor 115 in accordance with one embodiment of the present invention. Noise suppressor 115 comprises a front end high-pass filter (HPF) 205 for reducing low-frequency noise input to the noise suppressor. In one embodiment of the present invention, HPF 205 has a cut-off frequency at about 120 Hz. The reduced-noise signal is then sent to voice activity detector 215 and frequency band separator 210. Voice activity detector (VAD) 215 detects the speech-only and noise-only regions of the incoming audio data and closes switch 220 during the noise-only regions. VAD 215 makes a decision on whether the time and frequency frames at time m are noise-only signals ($n_m(t)$,$N_m(\omega)$), where $n_m(t)$ is the time domain noise signal and $N_m(\omega)$ is the frequency domain noise signal, or speech plus noise signals, ($s_m(t)+n_m(t)$, $S_m(\omega)+N_m(\omega)$), where $s_m(t)$ is the time domain voice signal and $S_m(\omega)$ is the frequency domain voice signal.

During the noise-only regions, the present invention collects characteristics of the input signal, such as level, spectral shape, duration, etc. This information is used to model the background noise. As will be explained below in greater detail, the background noise model can then be used to construct an inverse filter that suppresses the noise contribution in both the noise-only and speech-plus-noise regions. Although the noise is modeled only when there is no speech and suppression is done continuously, the noise background is assumed to be relatively stable, thereby allowing intermittent noise modeling to be used to construct a noise suppression device according to the present invention.

Frequency band separator 210 receives the mixed noise and voice signal and separates the signal into separate bands, each band containing a range of frequency information. There are a number of well-known devices suitable for performing frequency band separation. For instance, a bank of bandpass filters may be used to separate the signal into a number of channels, each channel having a bandwidth determined by the upper and lower cutoff frequencies of a selected one of the bandpass filters.

In a preferred embodiment of the present invention, frequency band separator 210 comprises a Fast Fourier Transform (FFT) circuit operating on, for example, 128 sample points of the input signal. A FFT circuit is more efficient than a corresponding bank of bandpass filters. The FFT circuit acts as a frequency domain suppression filter whose parameters are updated each frame using spectral estimates of both the signal and noise background. Input time-series audio data is transformed into frequency domain data, where estimates of the noise background spectrum are made to construct a suppression filter.

The frequency domain voice signal, $S(\omega)$, and the frequency domain noise signal, $N(\omega)$, generated by frequency band separator 210 are applied to magnitude detector circuit 225 and to adaptive noise filter 250. The output signal of magnitude detector circuit 225 is the absolute value of the input signal, thereby producing a magnitude spectrum of the complex output of the FFT in frequency band separator 210.

When VAD 215 determines that only noise is present on the output of HPF 205, VAD 215 closes switch 220 and the magnitude spectrum of the noise-only signal, |N|, is applied to amplifier 230, which has gain=$g_1$. The output of amplifier 230 is applied to one input of adder 235. The other input of adder 235 receives the output of adder 235 delayed one time frame by delay circuit 240 and amplified by amplifier 245, which has gain=$g_2$. Scaling the present noise frame by $g_1$ and adding it to the output of a previous frame scaled by $g_2$ exponentially smooths the current frame at the output of adder 235 in order to provide a stable estimate of background noise.

The output of adder 235, |N(ω)|, is applied to adaptive filter 250. During periods when a voice signal is present, switch 220 is opened and adaptive filter 250 receives the magnitude spectrum of the combined voice signals and noise signals, |S(ω)+N(ω)|, from the output of magnitude detector circuit 225. Adaptive filter 250 also receives the signal to be filtered, S(ω)+N(ω), directly from the output of frequency band separator 210. The inputs are combined to produce an adaptive filter function, described in greater detail below, and current frames are smoothed with past frames and smoothed over frequency. Adaptive filter 250 filters out the noise component in the frequency domain to produce an estimate, $S^+(\omega)$, of a speech only signal frame.

Next, any artifacts produced by the adaptive filter 250 are smoothed over by adding a fraction of the corresponding unfiltered speech signal pulse noise signal to the speech only signal frame. To do this, the unfiltered composite noise and speech signal, S(ω)+N(ω), at the output of frequency band separator 210 is filtered in band pass filter (BPF) 270. In a preferred embodiment, BPF 270 is a "tilt" filter, wherein the response in the passband is tilted, rather than flat, so that the gain near the high frequency cutoff is higher than the gain near the low frequency cutoff. This reduces the noise portion of the unfiltered composite noise and speech signal slightly. The composite signal is then scaled by amplifier 275, which has gain=$g_4$. The output of amplifier 275 is added in adder 265 to the speech-only output of adaptive filter 250, which has been scaled by amplifier 260, which has gain=$g_3$. The output of adder 265 is the speech-only signal with the artifacts from adaptive filter 250 smoothed over.

Finally, the speech-only frequency signal at the output of adder 265 is converted back to a time domain signal by frequency band combiner 280. In a preferred embodiment, frequency band combiner 280 performs an inverse Fast Fourier Transform ($FFT^{-1}$) function on the input waveform form adder 265. This final estimate of the "clean" speech signal is now ready for speech coding in speech coder 120.

The prior art noise suppression references disclose adaptive filter designs that use the power spectrum (i.e., magnitude squared), rather than the magnitude spectrum, of the received noise signals to filter noise from the speech plus noise signals. The present invention uses a magnitude spectrum of the noise signal to construct a noise model and filter noise form the speech-plus-noise signal, which greatly reduces filtering artifacts associated with the power spectrum.

The present invention also provides an improved noise suppression device by using noise-only frames that occurred more than q frames in the past (with q greater than one), rather than the current noise frame, to construct an inverse noise filter. VAD 215 cannot instantaneously detect the presence of speech in the incoming signal. Hence, there is a slight delay after the onset of speech before VAD 215 can open switch 220 and halt the noise modeling process during the (ideally) noise-only regions. By using delayed noise frames, recent frames that might contain the onset of speech (thus corrupting the noise model) can be avoided. This results in only high-confidence noise frames being kept for noise modeling.

The present invention smooths the adaptive noise filter coefficients in both the time domain (with past frames) and across bands in the frequency domain, thereby providing further artifact reduction. The present invention can also provide variable rates of smoothing, depending on the frequency band.

A further improvement provided by the present invention is the re-introduction (re-addition) of at least a portion of the band-pass filtered S(ω)+N(ω) data back into the adaptively filtered signal. The reintroduction of a part of this speech-plus-noise signal through the band-pass (or tilt) filter masks certain undesirable artifacts in the audio data that remain after the frequency domain noise-filtering by adaptive filter 250. This provides more natural sounding speech.

The operation of the present invention is such that automatic noise reduction is provided in both high and low noise environments. Whereas the prior art noise filters have minimum thresholds which limit operation in low noise environments, the present invention continually removes noise, thereby providing crispness to voice data having relatively benign background conditions.

In an exemplary embodiment of the present invention, noise suppressor 115 operates on a 10 millisecond data frame, which is sampled at 8 KHz to produce 80 samples of the combined speech and noise time domain signal. The 80 samples of the 10 millisecond data frame are combined with 48 samples from the previous frame to fill a 128 point FFT buffer, which is applied to frequency band separator 210. Frequency band separator 210 computes a 128-point FFT to produce the complex frequency domain output, S(ω)+N(ω). Magnitude detector circuit 225 generates the absolute value of the output of frequency band separator 210, producing thereby the magnitude spectrum, |S(ω)+N(ω)|.

As noted, noise suppressor 115 creates a model of the noise background in order to filter background noise out of the speech signal. Noise suppressor 115 modifies its noise model only during noise-only frames, as determined by VAD 215. A stable estimate of the noise background is calculated by exponentially smoothing the current noise frame with past frames (using amplifiers 230 and 245, adder 235, and delay circuit 240) according to the following:

$$|N^*_m(\omega)=g_1|N_{m-q}(\omega)|+g_2|N^*_{m-1}(\omega)|,$$

where $0<g_1\leqq 1$ and $g_2=1-g_1$. The smoothed noise signal, $|N^*_m(\omega)|$, is one of the inputs to adaptive filter 250. Another input to adaptive filter 250 is the frequency-domain composite voice and noise signal, $|X_m(\omega)|$, where: $|X_m(\omega)|=|S_m(\omega)+N_m(\omega)|$.

These two components are combined to produce the adaptive filter frame function below:

$$W_m(\omega)=\beta\frac{|x_m(\omega)|}{|x_m(\omega)|+\alpha|N^*_m(\omega)|},$$

where α is the suppression factor and β is the scaling factor.

Adaptive filter 250 also smooths the current frame with past frames according to the function:

$$W^*_m(\omega)=\lambda W_m(\omega)+(1-\lambda)W^*_{m-1}(\omega),$$

where $0\leqq\lambda\leqq 1$. The value of λ can vary from band-to-band, thereby providing more smoothing in noise bands and less smoothing in speech bands.

The smoothed filter frame is then padded with r/2 zeros on each end and smoothed again over frequency with filter, p:

$$W_m^{**}(k) = \sum_{j=-r/2}^{j=+r/2} W_m^{*}(k-j)p(j),$$

for $0 \leq k \leq 128$. The smoothed filter frames of adaptive filter 250 are then applied to the unfiltered composite voice and noise frames in the frequency domain to produce an estimate of a speech only signal frame:

$$S^{+}_{m}(\omega)=W^{++}_{m}(\omega)(S_m(\omega)+N_m(\omega)).$$

To smooth over any artifacts produced in the adaptive noise filtering process, a fraction of the corresponding unfiltered frequency-domain composite speech and noise signal is re-added in adder 265:

$$S^{\Delta}_{m}(\omega)=g_3 S^{+}_{m}(\omega)+g_4(S_m(\omega)+N_m(\mathbf{107}\ )),$$

where $0 \leq g_4 \leq 1$ and $g_3=1-g_4$.

The time-domain signal, $S^{\Delta}(t)$, is reconstructed using the overlap-add method of inverse Fast Fourier Transform ($FFT^{-1}$) synthesis. The inverse Fast Fourier Transform, which is performed in frequency band combiner 280, generates the speech only time-domain signal.

In one embodiment of the present invention, adaptive filter 250 comprises a single stage noise filter. In a preferred embodiment of the present invention, however, adaptive filter 250 comprises a multiple stage noise filter. Cascading the stages together creates a signal estimate at the output of each stage that can be used as the basis of a better noise filter at the next stage.

Figure 3:
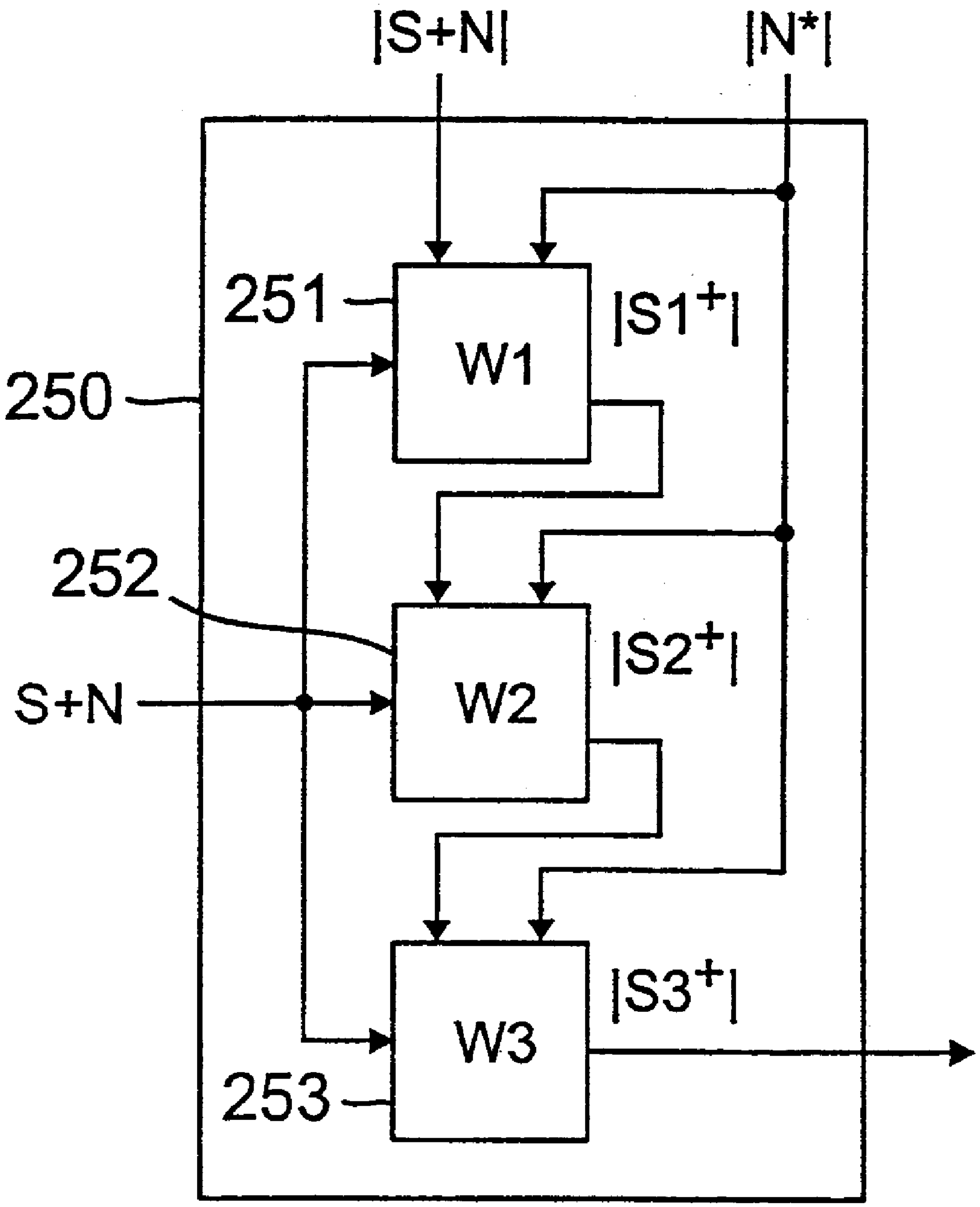
FIG. 3 illustrates a block diagram of an adaptive filter containing multiple stages according to one embodiment of the present invention.

FIG. 3 illustrates a block diagram of adaptive filter 250 containing multiple stages according to one embodiment of the present invention. Adaptive filter 250 comprises three subfilters 251–253 similar to the adaptive filter described above with respect to FIG. 2. Adaptive subfilter 251 produces a first estimate of the speech-only signal frame that is used as an input to adaptive subfilter 252. The output of adaptive subfilter 251 is given by:

$$S1^{+}_{m}(\omega)=W^{++}_{m}(\omega)(S_m(\omega)+N_m(\omega)).$$

Adaptive subfilter 252, in turn, produces a second estimate of the speech-only signal frame that is used as an input to adaptive subfilter 253, except that adaptive subfilter 252 uses the magnitude of the first speech-only estimate output of adaptive subfilter 251, rather than the unfiltered $|S(\omega)+N(\omega)|$. Similarly, adaptive subfilter 253 produces a third estimate of the speech-only signal frame that becomes the output of adaptive filter 250, except that adaptive subfilter 253 uses the magnitude of the second speech-only estimate output of adaptive subfilter 252, rather than the unfiltered $|S(\omega)+N(\omega)|$.

To maximize the effectiveness of the speech coding system, noise suppressor 115 adapts to different noise conditions at varying levels in order to operate effectively. Distortion and artifacts are kept to a minimum. Noise suppressor 115 effects an improvement in quality and performance over a speech coder system not containing noise suppressor 115.

Although the present invention and its advantages have been described in detail, those skilled in the art should understand that they can make various changes, substitutions and alterations herein without departing from the spirit and scope of the invention in its broadest form.

What is claimed is:

1. A noise suppressor that increases a signal to noise ratio of time domain audio data, comprising:

frequency domain transformation circuitry that transforms a frame of said time domain audio data into a frame of frequency domain audio data;

noise background modeling circuitry, coupled to said frequency domain transformation circuitry, that spectrally analyzes said frame of frequency domain audio data and exponentially smooths said frame with past frames of said frequency domain audio data to model an estimated noise background spectrum thereof;

a frequency domain suppression filter, coupled to said noise background modeling circuitry, that filters at least some of said noise background spectrum from said frame of frequency domain audio data; and time domain transformation circuitry, coupled to said frequency domain suppression filter, that transforms said frame back into said time domain, said transformed frame of time domain audio data having an increased signal to noise ratio.

2. The noise suppressor as recited in claim 1 further comprising a time domain suppression filter, coupled to said time domain transformation circuitry, that high-pass filters said transformed frame to increase said signal to noise ratio further.

3. The noise suppressor as recited in claim 1 wherein said noise background modeling circuitry is coupled to a voice activity detector (VAD), said noise background modeling circuitry modeling said estimated noise background spectrum as a function of a speech/no speech signal received from said VAD.

4. The noise suppressor as recited in claim 1 wherein said noise background modeling circuitry models said estimated noise background spectrum only when said frame contains substantially no signal.

5. The noise suppressor as recited in claim 1 wherein said frequency domain transformation circuitry and said time domain transformation circuitry each comprise fast Fourier transform (FFT) circuitry.

6. The noise suppressor as recited in claim 1 wherein said frame is less than 1 second long.

7. A method of increasing a signal to noise ratio of time domain audio data, comprising the steps of:

transforming a frame of said time domain audio data into a frame of frequency domain audio data;

spectrally analyzing said frame of frequency domain audio data and exponentially smoothing said frame of frequency domain audio data with past frames of said frequency domain audio data to model an estimated noise background spectrum thereof;

filtering at least some of said noise background spectrum from said frame of frequency domain audio data; and transforming said frame of frequency domain audio data back into said time domain, said transformed frame of time domain audio data having an increased signal to noise ratio.

8. The method as recited in claim 7 further comprising the step of high-pass filtering said transformed frame to increase said signal to noise ratio further.

9. The method as recited in claim 7 wherein said step of spectrally analyzing comprises the step of modeling said estimated noise background spectrum as a function of a speech/no speech signal received from a voice activity detector (VAD).

10. The method as recited in claim 7 wherein said step of spectrally analyzing comprises the step of modeling said estimated noise background spectrum only when said frame contains substantially no signal.

11. The method as recited in claim 7 wherein said steps of transforming each comprise the step of computing a fast Fourier transform (FFT).

12. The method as recited in claim 7 wherein said frame is less than 1 second long.

13. A noise suppressor that increases a signal to noise ratio of time domain digital audio data, comprising:

a voice activation detector (VAD) that detects when a frame of said time domain digital audio data contains substantially no signal;

initial fast Fourier transformation (FFT) circuitry that buffers and transforms said frame of time domain digital audio data into a frame of frequency domain digital audio data;

noise background modeling circuitry, coupled to said VAD and said initial FFT circuitry, that spectrally analyzes said frame of frequency domain digital audio data and exponentially smooths said frame of frequency domain digital audio data with past frames of said frequency domain digital audio data to update a model of an estimated noise background spectrum thereof when said VAD detects that said frame contains substantially no signal;

a frequency domain suppression filter, coupled to said noise background modeling circuitry, that filters at least some of said noise background spectrum from said frame of said frequency domain digital audio data as a function of said model; and subsequent FFT circuitry, coupled to said frequency domain suppression filter, that transforms said frame of frequency domain digital audio data back into said time domain, said transformed frame of time domain digital audio data having an increased signal to noise ratio.

14. The noise suppressor as recited in claim 13 further comprising a time domain suppression filter, coupled to said time domain transformation circuitry, that high-pass filters said transformed frame to increase said signal to noise ratio further.

15. The noise suppressor as recited in claim 13 wherein said VAD transmits a speech/no speech signal to said noise background modeling circuitry.

16. The noise suppressor as recited in claim 13 wherein said frame is padded to fill a buffer of said initial FFT circuitry.

17. The noise suppressor as recited in claim 13 wherein said frame is less than 1 second long.

* * * * *